(No Model.)
W. P. KOOKOGEY.
ELECTRIC RAILWAY SIGNAL.
No. 414,645. Patented Nov. 5, 1889.
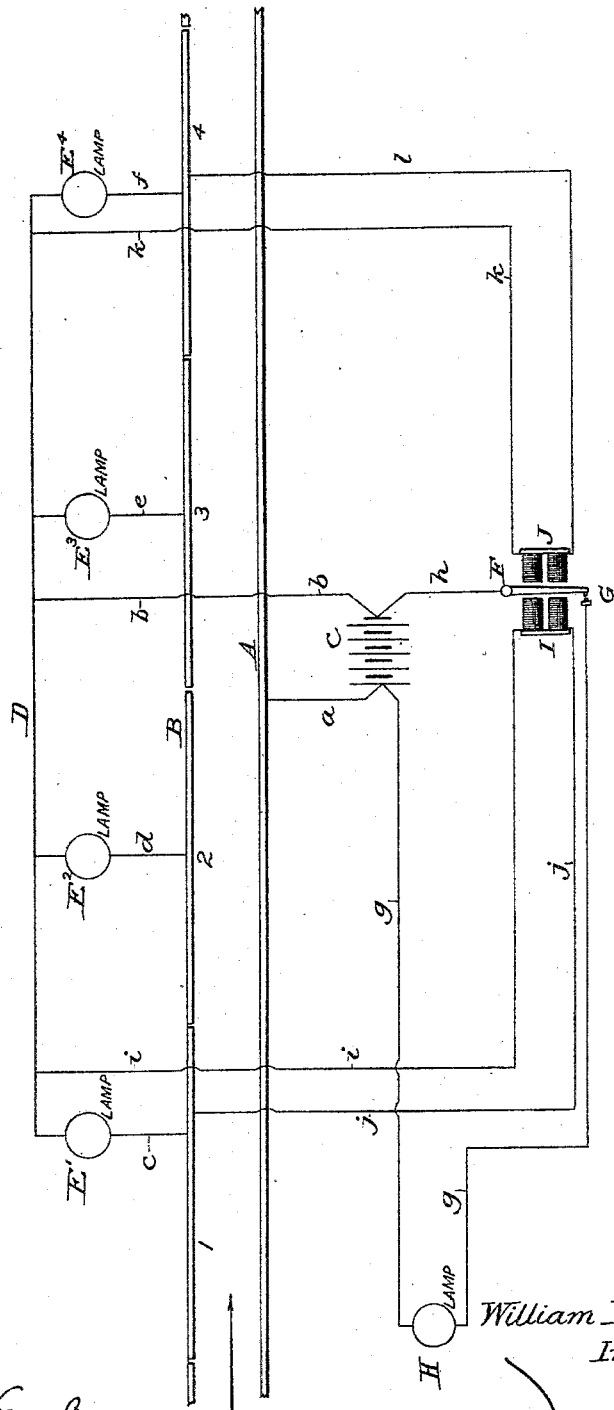
Witnesses:
James F. Duhamel
Walter S. Dodge
William P. Kookogey
Inventor,
by Dodge & Son,
his Attys.

UNITED STATES PATENT OFFICE.

WILLIAM P. KOOKOGEY, OF BROOKLYN, NEW YORK, ASSIGNOR TO THE KOOKOGEY ELECTRIC COMPANY.

ELECTRIC RAILWAY-SIGNAL.

SPECIFICATION forming part of Letters Patent No. 414,645, dated November 5, 1889.

Application filed March 15, 1887. Serial No. 230,975. (No model.)

*To all whom it may concern:*

Be it known that I, WILLIAM P. KOOKOGEY, of Brooklyn, in the county of Kings and State of New York, have invented certain new and useful Improvements in Electric Railway-Signals, of which the following is a specification.

My invention relates to railway-signals, and is designed more particularly for tunnels, deep cuts, and like places where trains are more or less hidden from view, though the invention is susceptible of general application as well.

Briefly stated, the invention consists in electric circuits which are closed or completed through the medium of the locomotive or train, and when completed cause an electric signal-light to be lighted at the entrance of the tunnel or cut, which causes other lights to be successively lighted and extinguished as the train moves through the tunnel or cut or over the road to light its passage, and through which finally the signal-light is extinguished when the train completes its travel over the guarded section.

The annexed drawing or diagram illustrates the arrangement of circuits and appliances therein for carrying my invention into practice.

A B indicate the two rails of a railway-track, the rail A constituting a continuous or unbroken metallic conductor of electricity, while rail B is divided into sections 1 2 3 4, &c., to any number desired, each section separated or insulated from the others.

C indicates a battery, preferably, though other well-known sources of electric energy may be substituted therefor, one pole of which (the positive pole advisably) is connected with rail A by a copper wire or other good conductor $a$, while the other pole is connected by a wire or conductor $b$ to a wire or conductor D running parallel with the track. From the conductor D branches $c\ d\ e\ f$ run to the sections 1 2 3 4 of rail B, each branch containing an electric light $E'\ E^2\ E^3$, &c., of suitable size and character. From the poles of battery C two other wires $g\ h$ proceed, one to a swinging or movable armature F and the other to a contact-block G, with which the armature makes connection when moved in one direction, thus completing a second circuit for battery C, passing through or including a signal-lamp H, introduced into wire $g$. The armature F is arranged to play horizontally between the poles of two electro-magnets I and J, which are arranged in multiple arc with lamp $E'$; or, in other words, one wire $i$ runs from magnet I to conductor D, and another wire $j$ runs therefrom to section 1 of rail B. Similarly a wire $k$ runs from magnet J to line D, and another wire $l$ runs therefrom to section 4 of rail B, the wires in each case of course connecting with opposite ends of the helix-wires of the magnets.

From the foregoing description it will be seen that if a locomotive or train approaches the cut or tunnel in the direction of the arrow and enters upon section 1 of rail B the wheels and axle at once bridge the rails A B and the electric circuit is completed from the positive pole of battery C through wire $a$, rail A, the wheels and axle of the locomotive or cars, wire C, conductor D, and wire $b$, the circuit thus passing through light $E'$ in wire C and causing it to become luminous. At the same time the circuit passing through wire $a$, rail A, the wheels and axle of the locomotive or cars to rail B traverses wire $j$, dividing between it and the wire C, goes through the coils of magnet I, thence through wire $i$, line D, and wire $b$ back to battery C. By thus completing the circuit, which includes magnet I, said magnet is energized and at once caused to attract armature F, which is thus brought into contact with block G, the magnet I being thus placed in multiple arc with lamps $E'\ E^2$, &c. This contact completes the second circuit of battery C, (or it may be an independent battery, if desired,) the current going through line $g$, block G, armature F, wire $h$, and battery C, passing through the lamp H in wire $g$ and rendering it luminous.

If it be desired to render lamp H more brilliant than lamps $E'\ E^2$, &c., it may be made of lower resistance; or two lamps of the same resistance may be employed in multiple arc. If in multiple arc, as above recited, magnet I should be of high resistance as compared with the lamps $E'\ E^2$, &c., so that the lamp may not be appreciably affected by the current passing through the magnet; but if arranged in series the magnet should be of as low resistance as practicable. Armature F, being arranged to swing in a horizontal plane and having no spring or other device to hold it in any particular position, of course remains at rest in any position to which it may be adjusted. As the locomotive or train leaves section 1 of rail B, wire c and the first lamp E', as also wires i j and magnet I, are cut out of the battery-circuit because the rails are no longer bridged within that section, and consequently the light E' ceases to burn. The armature F, however, remains in contact with block G, as above explained. At the moment section 1 is thus cut out the circuit is established through section 2 and afterward through section 3, and so on through the entire series, whatever may be the number, the signal-light H remaining luminous because of the contact of armature F and block G during all this time. When, however, the last section is reached, (in this case 4,) the circuit is completed through battery C, wire a, rail A, locomotive or car wheels and axle, section 4 of rail B, wire l, magnet J, wire k, conductor D, and wire b back to battery C, the magnet J thus becoming energized and attracts armature F, withdrawing it from contact with block G, destroying the circuit in which lamp H is included and thereby extinguishing the light of said lamp. The section numbered 4 in the drawing will be the last section of the portion of the road guarded by lamp H, whether there be a greater or less number than shown. There will of course be one section for each light or each group of lights E' E², &c., it being apparent that two or more lights may be included in each bridge-wire c d, &c.

In speaking of a "continuous rail," a continuous electrical conductor formed by the rail is meant, and by "divided rail" is meant one in sections separated or electrically insulated from each other. In some cases I may use the lights E' E², &c., without signal-lamp H. The magnets may be in series with lamps E' E², &c., instead of multiple arc.

I am aware that prior to my invention railway-tracks have been divided into insulated sections or blocks and the rails of each section caused to form part of a circuit, which circuits were successively closed or completed by the wheels and axles of a locomotive or train, the completion of the circuits successively causing electro-magnets in each in turn to be energized and to move or release a signal. This I do not claim.

As stated at the outset, my invention, though susceptible of wider application, is more especially designed for tunnels, deep cuts, and other places where trains are more or less hidden from view, and where, it may be added, it is desirable to light the way immediately before and during the passage of the train.

An object of first importance in my invention is to avoid the necessity of using movable switches, armatures, or other devices in order to display the principal signals, as such moving parts are always liable to fail of action, whereas the simple bridging of the rails is certain of accomplishment and the illumination of the lamps follows with certainty, thus avoiding even the slightest complication, and accomplishing directly, instead of indirectly, the end in view.

I am also aware that it has been proposed to combine with a railway-track a separate electric circuit having one main and two parallel branches, and rotary switches at the side of the track designed to be turned by a passing train to complete and break the branch circuits successively. This I likewise disclaim. Not only does it needlessly multiply conductors, but a switch of the character mentioned is very unreliable, for the reason that it is liable to be thrown past its proper position by a fast-moving train if struck fairly and properly; but even more so because of the lateral play allowed the trucks of an ordinary railway-train, which by actual measurement is found to be from one and a half to two and a half inches, to provide for which the treads of the wheels are made wide. Obviously, if the projecting arm or part carried by the train should be in proper position to strike the arms of the star-wheel of the switch when the truck-wheels are in their medial position on the rails, it would be apt to miss entirely or to collide with and destroy the star-wheel when at one or the other extreme of its lateral play; hence such construction is not the equivalent of that explained and claimed by me.

Finally, I am aware that it has been proposed to provide a track with signals at the end of each block and with intermediate signals, those at the ends of the block being set to and held at "danger" from the time the train enters the block until it leaves the same, and the intermediate signals being cleared as they are successively passed by the train. This I also disclaim, except as to the particular plan above described, in which lamps are employed and the use of switches, electro-magnets, armatures, &c., wholly dispensed with for any of the intermediate lights.

Having thus described my invention, what I claim is—

1. In combination with continuous rail A and separated rail B, battery C, conductor D, line a, connecting one pole of the battery with rail A, line b, connecting the other pole of the battery with conductor D, and bridge-lines connecting conductor D and the sections of rail B and each containing an electric light.

2. In combination with a battery and a circuit therefor, comprising opposite rails of a railway-track, an electric light introduced into said circuit, an electro-magnet in circuit with said light, a circuit-closer adapted to be closed through the action of the magnet, and a second battery-circuit containing a signal-lamp and having said circuit-closer introduced into and constituting a part of the circuit, all substantially as set forth.

3. In combination with a battery or equivalent source of electrical energy and a circuit therefor, comprising a continuous rail and a divided or sectional rail of the same track, electric lights introduced into said circuit, two electro-magnets in circuit with said lights, but having their circuits completed through different sections of the divided rail, a second circuit containing an electric signal-light, an armature situate between the two electro-magnets and constituting a part of the second circuit, and a contact-block also constituting a part of said circuit, all substantially as described and shown, whereby the passage of a locomotive or train along the track is caused to light the first lamp of the series and the signal-lamp, to extinguish the first and light the second lamp of the series, and so on to the end thereof, and finally to extinguish the last light of the series and the signal-light.

4. In combination with a continuous rail and a divided or separated rail, a battery or its equivalent having one pole connected with the continuous rail and the other pole connected with two separate sections of the divided rail, two electro-magnets connected with the battery through said continuous and divided rails, a second electric circuit, an armature and a contact-block located between the two magnets and constituting a circuit-closer for the second circuit, all substantially as explained, whereby the signal-light is lighted when the train enters upon a given section of rail B and extinguished when it leaves another given section thereof.

5. In combination with a continuous and a divided rail and a battery or equivalent source of electrical energy, having one pole connected with the continuous rail and the other pole connected with each of the sections of the divided rail, an electric light in each of the connections between the battery and the divided rail-sections, whereby the lights are lighted and extinguished successively during the passage of a locomotive over and the consequent bridging of the rails and completion of the circuit.

WM. P. KOOKOGEY.

Witnesses:
WILLIAM W. DODGE,
WALTER S. DODGE.